Patented Jan. 13, 1942

2,269,958

UNITED STATES PATENT OFFICE 2,269,958

FIRE EXTINGUISHING COMPOSITION

George Gordon Urquhart, Cynwyd, Pa., assignor to National Foam System, Inc., Philadelphia, Pa., a corporation of Delaware No Drawing. Application July 26, 1938,
Serial No. 221,461

5 Claims. (Cl. 252—3)

This invention relates generally to fire extinguishing compositions and more particularly to such compositions as are capable, when combined with water, of producing a stabilized foam which is non-supporting to combustion and serves as a blanket to smother and extinguish the flames of such combustible materials as oil and gasolene.

Heretofore and prior to this invention, various foam-forming compositions have been employed more or less successfully to combat oil and gasolene fires. These compositions ordinarily involve the use of sodium bicarbonate and aluminum sulphate together with a stabilizing ingredient such as extract of licorice or of oak bark to increase the surface viscosity of the gas bubbles formed when the composition is combined with water. While it has been found preferable to introduce the acid and basic foam producing reagents together with the stabilizing ingredient into flowing water in the form of dry powders, in some systems separate solutions of these reagents are maintained in suitable tanks from which they are drawn off and mixed together to form foam as the necessity required. In one form of the dry powder system, the powdered sodium bicarbonate (the basic reagent), the powdered aluminum sulphate (the acid reagent) and the powdered stabilizer are commonly introduced into a single stream of water which conveys the foam to the fire to be extinguished. In another form of the dry powder system, the powdered basic and acid ingredients are simultaneously introduced into separate streams of water to respectively form separate acid and basic solutions which are subsequently merged into a single stream whereupon the foam is produced as a product of the reaction, the stabilizer being introduced into one or the other of the streams of water together with the acid or basic reagent. The methods just described produce foam as the result of the chemical reaction between the acid and basic foam forming solutions and the foam so produced is best termed chemical foam.

As distinguished from such chemical foam is the so-called mechanical or air foam, which while resembling in appearance and action the chemical foam, is formed not by the chemical reaction of foam forming solutions but by entraining a gaseous medium, such as air, into a finely subdivided stream of water in the presence of a suitable foaming agent or stabilizer.

It is among the objects of the present invention to provide a stabilizer for foam produced either chemically or mechanically which is inexpensive and readily obtainable in any requisite quantities within the United States and which provides for the production of a more stable foam of better quality than has been obtainable heretofore by the use of more expensive and less readily obtainable materials.

I have discovered that the soybean, of which there is an abundance in this country, provides the base of a variety of compounds which may be employed as the stabilizing agent in the production of fire extinguishing foam either mechanically or chemically. Not only does the soybean offer an excellent source of material for imparting a greatly increased surface rigidity to the foam bubbles, but the stabilizer derived from the soybean additionally imparts to the foam such cohesive strength that an unusually tight blanket thereof is formed for smothering oil and other such liquid fires and which serves most effectively to check re-ignition in fires of highly volatile liquids. Moreover, foam stabilized in accordance with the present invention possesses excellent adhesive strength and clings to ceilings and vertical surfaces in such manner as to render it exceedingly effective for use in blanketing and extinguishing fires over areas and surfaces which have been difficult heretofore to adequately coat with foam.

The proteins derived from the soybean offer an excellent material for use as a foam stabilizer because such proteins impart to the foam bubbles rigid adsorption surfaces. If the soybean proteins are to be employed as the foam stabilizing agent, they may be obtained by extraction from the soybean meal by methods well known in the art or they may be purchased in protein form directly from commercial producers thereof. Since the soybean proteins are generally precipitated in commercial practice at an isoelectric point usually falling within a range of pH 4.7 and pH 5.2, it is advisable to add an alkali to such commercially produced proteins to increase the pH to 7.0 or more in order to render the proteins more soluble in water. A similar result may be obtained by adding an acid to the proteins to decrease the pH to less than 4.7. Preferably, the soybean protein is degraded by boiling it in either a caustic alkali solution of about 15% concentration or in a sulphuric acid solution of about 25% concentration.

While the soybean itself may be employed to produce the stabilizing agent of the present invention, it is preferable to use what is known as soybean meal which is obtained from the bean upon extraction of the oil therefrom.

In the processing of the soybean meal to obtain the desired stabilizer, the meal may be digested in accordance with any of the following methods. For example, one ton of soybean meal may be digested with 350 gallons of an eight percent (8%) sodium hydroxide solution maintained at a temperature ranging from 200 to 290 degrees Fahrenheit and for a period ranging from two hours to one-half hour. Or, a similar quantity (one ton) of the soybean meal may be digested with 350 gallons of a ten percent (10%) solution of sulphuric acid of the same temperature and for the same period as aforesaid. In either case, the solution is diluted and then filtered and evaporated to suitable consistency and the resultant concentrated mass is then dried and ground to provide the desired stabilizer in powdered form. In order to facilitate filtering should satisfactory skill and equipment not be available, the admixture of coarse ground peanut shells with the soybean meal during the digestion process is recommended.

Another method of processing the soybean meal is to mix a sufficient quantity thereof with hot concentrated sodium hydroxide to form a paste and, after about twenty minutes digestion, to dilute the pasty mass with about eight parts of hot water, the diluted mass being then boiled for a short time and finally filtered and evaporated, to a consistency suitable for drying and grinding.

Still another method is to treat the soybean meal with a mixture of equal volumes of concentrated sulphuric acid and water. If the meal is introduced into a previously mixed solution of the concentrated sulphuric acid, the solution containing the meal is heated for about twenty minutes, while if the meal is admixed at the same time that the acid and water are mixed together, the heat generated by the mixing of the latter is sufficient for the digesting process. Preferably, one ton of soybean meal is thus treated with one and one-quarter tons of the concentrated sulphuric acid mixture, the mass being kept hot for about twenty minutes, and then diluted with about 400 gallons of water and boiled for a short time, following which it is filtered and evaporated to a consistency suitable for drying and grinding.

In addition to the foregoing, other methods may be employed for treating the soybean meal such as by oxidizing it with potassium permanganate, by reacting it with nitrous acid, or by digesting it with oleic acid, but for economy and best results the methods of treatment hereinbefore described are to be preferred.

Where it is desired to employ the soybean meal in its commercially produced form as a foam stabilizer without subjecting it to any of the foregoing treatment, such meal is preferably ground to a mesh of about 300 in which form it may well be employed as a powdered stabilizer agent.

I have found that when the soybean meal has been treated as above described, that is, digested with either caustic alkali or acid solution, and the resultant evaporated mass has been dried and ground, a dry, powdered stabilizer is obtained of low hygroscopicity. This characteristic is of particular value when the stabilizer is to be employed in the dry powder systems of producing foam wherein the foam forming agents, such as sodium bicarbonate and aluminum sulphate with one or the other of which the stabilizer is mixed, are introduced into flowing by the suction created by the latter in its passage through a foam generator.

It will be understood, of course, that the filtered and evaporated mass obtained as the resultant product of the digestion processes above described need not in all instances be dried and ground. This latter processing is only necessary when the stabilizer is to be employed in the dry powder foam generator systems of producing foam. When the stabilizer is to be employed in the two solution system wherein separate acid and basic foaming solutions are maintained ready for mixture together only as foam is desired to be produced, the final steps of drying and grinding may be eliminated and the filtered and evaporated mass may be dissolved, without further treatment, in one or the other of said solutions in whatever proportion is necessary for stabilizing the foam. Inasmuch as the stabilizer of the present invention is readily soluble in water, it is also well adapted to produce the necessary stabilizer solution such as is employed in mechanical foam systems wherein air or other gas is entrained in a finely subdivided stream of water in the presence of the stabilizer solution.

If desired, small quantities of paraformaldehyde, sodium ortho phenyl phenate, or sodium 2-4-5 trichlorphenate may be added to the solutions containing the stabilizer of the present invention to inhibit mold or retard decomposition where the conditions might favor such deleterious action.

In the use of the present stabilizer, the proportions thereof will vary, of course, in accordance with the ingredients used therewith to produce stabilized foam. For the production of a stiff, cohesive and adhesive foam, the following formula is exemplary:

| | | |
|---|---|---|
| Water | gallons | 150 |
| Sodium bicarbonate | pounds | 88 |
| Aluminum sulphate | do | 100 |
| Stabilizer (digested soybean meal) | do | 12 |

While the stabilizer may be mixed with either the acid or the basic foam forming ingredient, it is preferable to mix it with the latter, and a general formula would be to use in any given charge thereof approximately 85 to 88% by weight of sodium bicarbonate and 15 to 12% by weight of the stabilizer, this basic charge being combined with an acid aluminum sulphate charge of equal weight for dissolution in water to form stabilized foam. Should the pulverized undigested soybean meal be employed, approximately 20 to 25% thereof by weight would be employed in the basic foam forming charge.

For use in the production of mechanical foam wherein a solution of the stabilizer is employed, sufficient stabilizer is dissolved in a suitable solvent to prepare a concentrated solution thereof. I have found that in certain instances the quality of the mechanically produced foam may be increased by adding to the concentrated solution of the stabilizer a small quantity of a suitable wetting agent having good foaming properties, such as "Tergitol Penetrant." In practice, the quantity of concentrated stabilizer solution introduced into the flowing stream of water in which is entrained the air or other gas represents about two to eight percent of a given volume of water.

What is claimed as new and useful is:

1. A process of producing a stable fire-extinguishing foam which comprises combining a degraded proteinaceous material derived from the soybean with foam producing substances in such proportions as to form a fire-extinguishing blanket of foam.

2. A process of producing a stable fire-extinguishing foam which comprises combining separate solutions of the acid and basic foam-forming reagents at least one of which solutions includes as the stabilizer a proteinaceous material extracted or derived from the soybean.

3. A process of producing a stable fire-extinguishing foam which comprises mixing a gaseous medium in a finely subdivided stream of water containing a stabilizer consisting of a degraded proteinaceous material derived from the soybean.

4. A fire-extinguishing composition comprising a mixture of acid and basic foam-forming reagents and a stabilizer in the form of a water-dispersible proteinaceous product derived from the soybean.

5. A fire-extinguishing composition comprising a mixture of acid and basic foam-forming reagents and a water soluble stabilizer in the form of a proteinaceous product derived from the soybean.

GEORGE GORDON URQUHART.